April 10, 1945. J. D. DANFORTH 2,373,227
PROCESS FOR THE REFINING OF HYDROCARBON OIL
Filed Dec. 31, 1941
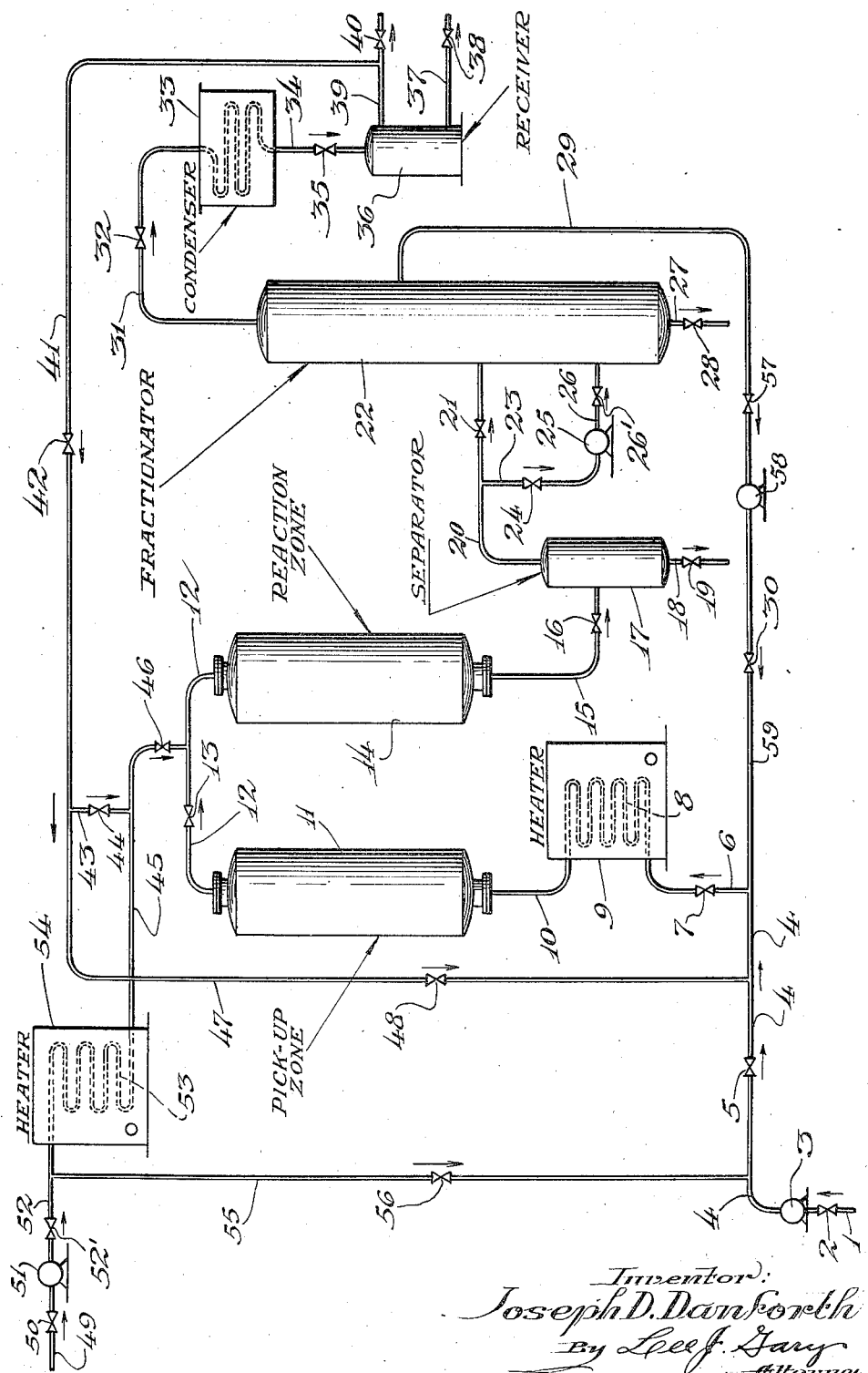
Inventor:
Joseph D. Danforth
By Lee J. Gary
Attorney Patented Apr. 10, 1945

2,373,227

UNITED STATES PATENT OFFICE 2,373,227

PROCESS FOR THE REFINING OF HYDROCARBON OIL

Joseph D. Danforth, Chicago, Ill., assignor to Universal Oil Products Company, Chicago, Ill., a corporation of Delaware Application December 31, 1941, Serial No. 425,107

5 Claims. (Cl. 196—30)

This is a continuation-in-part of my copending application Serial No. 370,323, filed December 16, 1940.

This invention relates to the refining of gasoline and other hydrocarbon distillates to improve the properties thereof. More specifically the invention is concerned with an improved method for treating gasoline wherein the treating action is effected in a packed reaction zone in the presence of a catalyst or treating agent introduced into the reaction zone by means of a fluid carrying medium.

Straight run or cracked gasolines may be treated to reduce the gum and sulfur contents or to improve antiknock and other properties by the use of volatilizable or soluble catalysts or treating agents such as certain volatile halides, including aluminum chloride and aluminum bromide. When using treating agents of the volatile halide type, the treating process is preferably conducted in the presence of a hydrogen halide such as hydrogen chloride, and when desired, hydrogen may also be present.

In such a treating process it is necessary to have an appreciable quantity of the treating agent in the reaction zone. The treatment is sometimes carried out with the treating agent in the form of lumps or granules, per se or deposited on a carrying medium, which are contained in a reaction zone. The hydrocarbon oil to be treated is passed through this zone in contact with the bed of treating agent. The difficulty in such an operation is that relatively large quantities of active agent are required at any one time, and, furthermore, the catalyst is subject to poisoning or contamination. Even though a large portion of the agent may apparently be unchanged, the accumulation of poisons or contaminants is sufficient to reduce the available useful activity of the agent to a point which is often below the economical range.

Such a process is almost completely inoperative when oils containing certain highly reactive components are to be treated. For example, substantial amounts of olefinic and/or aromatic hydrocarbons may cause almost complete loss of activity of treating agents containing aluminum chloride or bromide when used in the fixed-bed type operation such as has just been described. The so-called "lower layer" compounds are formed which have little or none of the desired treating activity, and these compounds or their decomposition products may mask the remaining activity of the treating agent. It will be apparent that my invention minimizes such effects.

If, instead of the fixed-bed operation, a quantity of the treating agent is volatilized and contacted with the hydrocarbon oil to be treated, it is usually necessary to recycle large amounts of the active agent in order to maintain the necessary quantity of treating agent in the reaction zone.

The process of the present invention, avoids the recycling of large amounts of treating agents when using dissolved or volatilized treating agents. The reaction zone contains a solid material, usually granular, which may be in the form of a packing, and substantial amounts of treating agent may be gradually and continuously introduced into the reaction zone by a fluid carrying medium. By this method the treating agent appears to be retained in the reaction zone for a sufficient time to be effectively used without waste and without the need for as much recycling as in cases wherein the solid material is not present. Moreover, it is possible to obtain the advantages of maintaining the relatively high concentration of treating agent necessary for the reaction without the disadvantages attendant on the usual fixed bed operations wherein excessively large amounts of treating agent are contacted with the material undergoing reaction.

In one specific embodiment, the present invention comprises a process for treating gasoline-containing distillates in the presence of a treating agent introduced in refining amounts by means of a fluid carrying medium into a reaction zone containing a packing material.

The art of treating petroleum hydrocarbon oils and distillates with aluminum chloride is well known in the petroleum industry. The main objects of aluminum chloride treating may be summarized as follows:

1. Improvement of odor and color
2. Removal or alteration of objectionable sulfur compounds
3. Reduction or prevention of gum formation
4. Improvement in antiknock properties.

In addition, aluminum chloride treating may result in saturating certain unsaturated compounds present in the distillate and in increasing the percentage of lower boiling components.

It is evident that the chemistry of aluminum chloride treating of hydrocarbons is complicated, and may involve polymerization, condensation, saturation, desulfurization, etc. Moreover, the method has not found widespread commercial application largely due to treating losses, large reagent consumption, the difficulties involved in controlling the reactions, etc.

By the process of this present invention, however, it is possible to control the concentration of the aluminum chloride or other treating agent possessing similar properties to such an extent that the disadvantages inherent in the methods formerly used are largely avoided or minimized. In the operation of the invention using a volatile halide as the treating agent, a fluid substance such as hydrogen chloride, hydrogen, or a paraffinic hydrocarbon such as propane or butane may be used as a carrying fluid for introducing the treating agent into the reaction zone from an outside source. The fluid, which may be in gaseous or liquid form, is passed through a catalyst pickup zone containing the treating agent. This may be disposed in the pickup zone as solid granules of pure halide, as a liquid, as retained on an adsorbent material, as a binary or ternary mixture with other metal halides, or in any convenient form. The pickup zone is maintained at the pressure and temperature required in order to introduce the desired amount of catalyst or treating agent into the carrying fluid.

The gasoline to be treated may be heated in an independent zone and introduced into the reaction zone containing a solid material, which may be, e. g., in the form of a packing material, disposed in a tower or chamber.

It may also be advantageous in some cases, for example, at the beginning of a run, to impregnate or coat the packing material with the volatile treating agent so that the treating effect may be obtained at once without waiting for the agent to accumulate in the treating zone.

The carrying fluid containing the volatile halide is either mixed with the gasoline stream at the inlet to the reaction zone or added to the reaction zone at any convenient point or plurality of points. In this way, the treating agent may be introduced continuously with a portion of the gasoline to be treated. As the active agent in the treating zone becomes spent with use, a further quantity of fresh agent is available because it is being replaced continuously. In an alternative operation, not necessarily equivalent to this, the metal halide may be introduced intermittently.

While I have referred in this specification to the use of certain "volatilizable" treating agents such as "volatile halides," it is not intended necessarily that the treating agent be carried in a volatilized condition to the packed reaction zone. It is true that in many cases when operating with agents such as aluminum chloride (or other halides capable of being volatilized at relatively low temperatures), the conditions of temperature and pressure in the pickup zone are such that the desired amount of treating agent is continuously volatilized and carried into the treating zone by the mechanical entraining action of the stream of carrying fluid. However, under other operating conditions and with other carrying fluids, it appears that the treating agent may actually dissolve in the carrying fluid, e. g. when the temperature and pressure in the pick-up zone are so adjusted as to maintain a liquid phase therein. In any event it is not intended that the essential carrying action of the carrying fluid be limited to a single mechanism or explanation. The term "volatile halide," therefore, has been used as a means of identifying a class of treating agents and not as a limiting explanation of the operation of the process.

The packing material in the reaction zone may include relatively porous materials, relatively absorptive materials, and others of a less porous or absorptive nature, e. g., porcelain, pumice, firebrick, quartz, activated charcoal, other activated carbons, diatomaceous earth, kaolin, raw and acid treated clays, silica gel, alumina, magnesia, zirconia, titania, composites of silica with alumina and/or zirconia, and metals possessing considerable surface such as spongy iron. The solid material should not react to poison or otherwise unduly modify or destroy the treating effect of the agent.

The alternative reactor packing materials are not necessarily equivalent in their action and the particular packing employed in any given treating process is dependent upon the charging stock being treated, the temperature and pressure employed, the nature of the treating agent, and other factors. If desirable, the treating agent and the carrying fluid may be introduced into the reaction zone at various points between the inlet and exit thereof so that the aluminum chloride is present in the optimum concentration at points throughout the reaction zone.

I now refer to the accompanying drawing in which I have shown one embodiment of my process. It is understood, of course, that the drawing is not intended to limit my invention to the specific details and arrangement of apparatus shown therein, but rather to diagrammatically illustrate the general usefulness and advantages of the process.

A fluid carrying medium which, for purposes of illustration, may comprise a mixture of hydrogen chloride and hydrogen is introduced into the system through line 1 and valve 2 to pump 3. The discharged fluid passes through line 4 containing valve 5, line 6, and valve 7 to heating coil 8 located in furnace 9. The heated fluid is directed through line 10 to pickup zone 11. The temperature and pressure of the carrying fluid in this zone are adjusted to introduce the desired amount of treating agent into the stream. In this case the treating agent contained in zone 11 may conveniently be aluminum chloride in granular form.

The aluminum chloride-containing fluid passes through line 12 containing valve 13 to reaction zone 14. The gasoline to be treated enters line 49 and valve 50 and is pumped by pump 51 through line 52 containing valve 52' to heating coil 53 disposed in furnace 54. The gasoline is discharged through line 45 and passes through valve 46 to line 12 where it is commingled with the aluminum chloride-containing stream at the inlet of reaction zone 14.

The reaction products leave the reaction zone through line 15 and valve 16 and are introduced into a separator 17. From the bottom of this zone a sludge comprising an aluminum chloride organic complex is continuously removed through line 18 and valve 19. The remainder of the reaction products is removed overhead through line 20 and discharged through valve 21 into fractionator 22. If it is desired to operate fractionator 22 at substantially high pressures in order to facilitate the recovery of hydrogen chloride, the reaction products may be charged to the fractionator through line 23, valve 24, pump 25, line 26, and valve 26'.

Higher boiling material which is formed during the reaction may be removed from the bottom of the fractionator through line 27 and valve 28. Overhead, a stream of gasoline-containing distillate and non-condensable gases is removed through line 31 and valve 32 to condenser 33. The condensate and gases pass through line 34 and valve 35 to receiver 36. The liquid product may be removed through line 37 and valve 38. The non-condensable gases which in this case contain hydrogen chloride in addition to hydrogen and light hydrocarbons are removed through line 39 and valve 40. If desired, however, a portion or all of this gas may be passed through line 41, valve 42, line 43, and valve 44 into line 45. The hydrogen chloride is thus commingled with the gasoline charge and is recycled to the reaction zone. It is also possible to recycle all or a portion of the hydrogen chloride-containing gases through the pickup zone. In this case the gases pass through line 41, valve 42, line 47 and valve 48 into line 4 where they are commingled with the incoming carrying fluid.

In certain cases, especially when treating a straight run or highly saturated gasoline, it may be desirable to remove a sidecut from the fractionator and utilize this material exclusively or as a portion of the fluid carrying medium charged to the pickup zone. In this case, the sidecut passes through line 29 and valve 57 to pump 58 which discharges through line 59 containing valve 30 into line 6 where it is charged with the other components of the carrying fluid to the heater and pickup zone. In other cases it may even be desirable to use a portion of the hydrocarbon being treated as the carrying fluid. Following this procedure, part of the hydrocarbon passes from line 52 through line 55 containing valve 56 into line 4. Here, if desired, it is admixed with other carrying fluids.

The operating conditions of my process will depend to a large extent on the nature of the gasoline or distillate being treated. Usually I prefer to use atmospheric or moderate superatmospheric pressures in the reaction zone, but pressures of the order of 200–300 pounds per square inch or more may be used. The temperature in the reaction zone will usually be below about 700° F. However, in many cases of desulfurization or the removal of gum forming constituents I prefer to operate within the range of about 50° F. to about 200° F.

The following examples are given to illustrate the usefulness and operability of my process, but in no way do I intend to limit my invention to the specific details therein.

Example 1

A straight run gasoline obtained from the distillation of a California crude and possessing a sulfur content of 0.5% may be treated according to my process. A mixture of hydrogen chloride and plant gas comprising essentially hydrogen and methane is used as the fluid carrying medium, and the pickup zone contains granular lumps of aluminum chloride. The reaction zone is packed with crushed firebrick. At atmospheric pressure and a temperature of 120° F. the sulfur content of the gasoline may be reduced from 0.5 to 0.02%. The desulfurized gasoline is negative to the doctor test and to the copper strip corrosion test. The antiknock properties and color are substantially improved.

Example 2

A thermally cracked gasoline having a bromine number of 65 and containing about 35% unsaturates may be treated with aluminum chloride in a manner similar to Example 1. In this case about 5 mol percent hydrogen and about 10 mol percent hydrogen chloride are present in the reaction zone. The aluminum chloride may be picked up with liquefied butane at about 100° F. The resulting product has a copper dish gum content of about 10 mg. with an induction period of 160 min. which is readily increased by added gum inhibitor and possesses a good color and odor. The susceptibility of the treated gasoline to added tetraethyl lead is substantially increased.

I claim as my invention:

1. In the refining of hydrocarbon oils wherein the oil is passed through a treating zone containing a solid packing material and therein subjected to the refining action of an aluminum halide, the improvement which comprises maintaining a bulk supply of aluminum halide in a zone apart from said treating zone, passing through and in relative movement with said bulk supply in the second-mentioned zone a gaseous medium comprising a hydrogen halide, the gaseous medium being passed through the second-mentioned zone under conditions such as to pick up in said medium only a portion of said bulk supply of aluminum halide, and introducing the resultant aluminum halide-containing gaseous medium to said treating zone during the oil refining operation being performed in the last-named zone.

2. In the refining of hydrocarbon oils wherein the oil is passed through a treating zone containing a solid packing material and therein subjected to the refining action of aluminum chloride, the improvement which comprises maintaining a bulk supply of aluminum chloride in a zone apart from said treating zone, passing through and in relative movement with said bulk supply in the second-mentioned zone a gaseous medium comprising hydrogen chloride, the gaseous medium being passed through the second-mentioned zone under conditions such as to pick up in said medium only a portion of said bulk supply of aluminum chloride, and introducing the resultant aluminum chloride-containing gaseous medium to said treating zone during the oil refining operation being performed in the last-named zone.

3. The improvement as defined in claim 1 further characterized in that said portion of the bulk supply of aluminum halide is vaporized in said second-mentioned zone and the vapors thereof carried into the treating zone in said gaseous medium.

4. The improvement as defined in claim 2 further characterized in that said gaseous medium comprises hydrogen in addition to the hydrogen chloride.

5. The improvement as defined in claim 1 further characterized in that said gaseous medium contains hydrogen.

JOSEPH D. DANFORTH.